United States Patent
Hatano et al.

(10) Patent No.: US 7,916,185 B2
(45) Date of Patent: Mar. 29, 2011

(54) WIDE DYNAMIC RANGE IMAGE CAPTURING APPARATUS

(75) Inventors: Toshinobu Hatano, Kyoto (JP); Hiroki Hatiyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 917 days.

(21) Appl. No.: 11/699,387

(22) Filed: Jan. 30, 2007

(65) Prior Publication Data

US 2007/0177035 A1    Aug. 2, 2007

(30) Foreign Application Priority Data

Jan. 30, 2006    (JP) ................................ 2006-020222

(51) Int. Cl.
H04N 5/76 (2006.01)
H04N 5/262 (2006.01)
H04N 9/73 (2006.01)
H04N 5/202 (2006.01)

(52) U.S. Cl. ................. 348/231.99; 348/239; 348/223.1; 348/254

(58) Field of Classification Search ............... 348/239, 348/231.99, 222.1, 223.1, 254
See application file for complete search history.

(56) References Cited

U.S. PATENT DOCUMENTS

| | | | | |
|---|---|---|---|---|
| 5,162,914 A | * | 11/1992 | Takahashi et al. | 348/229.1 |
| 5,455,621 A | * | 10/1995 | Morimura | 348/229.1 |
| 5,801,773 A | * | 9/1998 | Ikeda | 348/229.1 |
| 6,219,097 B1 | * | 4/2001 | Kamishima et al. | 348/297 |
| 7,098,946 B1 | | 8/2006 | Koseki et al. | |
| 2001/0008419 A1 | | 7/2001 | Sano et al. | |
| 2002/0118293 A1 | | 8/2002 | Hori et al. | |
| 2004/0004666 A1 | | 1/2004 | Sano | |
| 2004/0070778 A1 | * | 4/2004 | Matama | 382/260 |
| 2007/0024713 A1 | * | 2/2007 | Baer et al. | 348/207.99 |

FOREIGN PATENT DOCUMENTS

| | | |
|---|---|---|
| JP | 63-306779 A | 12/1988 |
| JP | 07-131718 | 5/1995 |
| JP | 2000-092378 | 3/2000 |
| JP | 2001-197362 | 7/2001 |
| JP | 2003-169259 | 6/2003 |

OTHER PUBLICATIONS

Japanese Notice of Reasons for Rejection, w/ English translation thereof, Issued in Japanese Patent Application No. JP 2006-020222 dated Sep. 21, 2010.

* cited by examiner

*Primary Examiner* — Nhan T Tran
(74) *Attorney, Agent, or Firm* — McDermott Will & Emery LLP

(57) ABSTRACT

A memory control block performs in parallel a process of writing a current frame of image data captured by an image capturing device into a system shared memory, a process of reading out a previous frame of image data stored in the system shared memory, and a process of writing combined image data generated in an image combining block into the system shared memory.

11 Claims, 7 Drawing Sheets

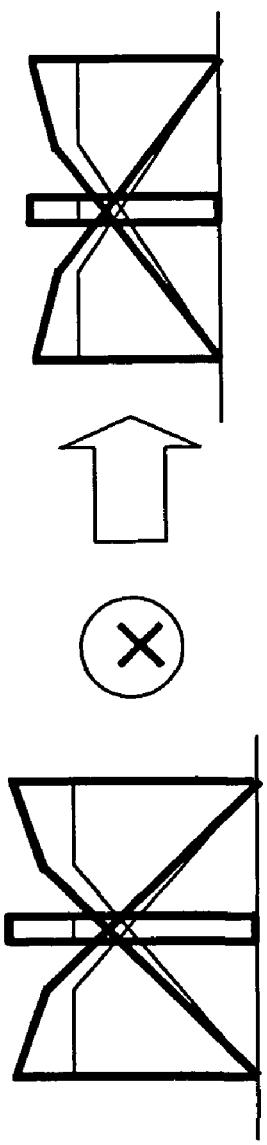
FIG.3
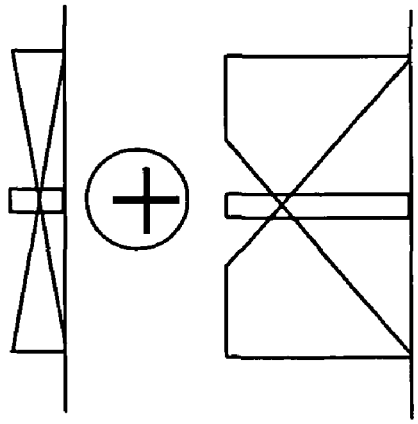

WIDE DYNAMIC RANGE IMAGE CAPTURING APPARATUS

CROSS REFERENCE TO RELATED APPLICATIONS

This Non-provisional application claims priority under 35 U.S.C. §119(a) on Patent Application No. 2006-20222 filed in Japan on Jan. 30, 2006, the entire contents of which are hereby incorporated by reference.

BACKGROUND OF THE INVENTION

1. Field of the Invention

The present invention relates to a wide dynamic range image capturing apparatus for processing video data supporting an image sensor developed for a digital camera.

2. Description of the Related Art

In recent years, the camera industry is remarkably moving from analog technology to digital technology. Particularly, a boom has occurred in digital still cameras, which require neither films nor development, and mobile telephones with built-in digital camera are becoming mainstream mobile telephones.

At present, most digital cameras adopt signal processing which supports a sensor having a primary color filter, in favor of color reproduction. There is a demand for a signal processing technique for digital cameras which can provide excellent color signal-to-noise ratios while putting importance on resolution, and can also provide excellent tone characteristics and high sensitivity.

As a technique in such a field, for example, Japanese Unexamined Patent Application Publication No. 63-306779 discloses a technique of controlling the exposure amount (electric charge accumulation period) of an image capturing device and successively combining images, thereby making it possible to support moving images.

FIG. 7 is a block diagram illustrating a configuration of a conventional wide dynamic range image capturing apparatus. In FIG. 7, 201 indicates an analog-to-digital converter, 202 indicates a control circuit, 203 indicates a digital-to-analog converter, 204 indicates a camera signal processing circuit, 205 indicates an image capturing device for performing photoelectric conversion with respect to a subject, 206 and 207 indicate field memories, and 208 indicates a switch circuit. Hereinafter, an operation of the conventional wide dynamic range image capturing apparatus will be described.

Initially, in the image capturing device 205, images are successively captured while switching the electric charge accumulation period between $1/1000$ seconds and $1/120$ seconds (see (a) of FIG. 8). Here, an image captured when the electric charge accumulation period is $1/1000$ seconds is temporarily stored into the field memory 206.

Next, with timing of an image obtained during the electric charge accumulation period of $1/120$ seconds, the image stored during the electric charge accumulation period of $1/1000$ seconds is read from the field memory 206 (see (b) of FIG. 8). Thereafter, the image is written into the field memory 207 while switching (combining) the electric charge accumulation period between $1/120$ seconds and $1/1000$ seconds, depending on a predetermined condition. Note that it is assumed that, when there is overexposure during the electric charge accumulation period of $1/120$ seconds and there is not underexposure during the electric charge accumulation period of $1/1000$ seconds, an image of $1/120$ seconds is switched to an image of $1/1000$ seconds. Thus, in the control circuit 202, images are switched (combined) (see (c) of FIG. 8).

Thereafter, the combined image signal is subjected to speed conversion in the field memory 207 so that a scanning speed is returned to the speed of a normal TV signal, which is in turn output ((d) of FIG. 8).

By performing such an image combining process, an image which is otherwise conventionally overexposed or underexposed is replaced with an image having a different electric charge accumulation period, thereby making it possible to enlarge the dynamic range of images.

SUMMARY OF THE INVENTION

However, in conventional wide dynamic range image capturing apparatuses, an output image is an extracted portion which is free from saturation or underexposure. Therefore, in the case of a high-contrast image in which a signal level continuously changes, a discontinuous portion is generated in the extracted portion, resulting in a decrease in image quality.

In view of the above-described problems, the present invention is achieved. An object of the present invention is to output a captured and combined image in which a signal level is continuous throughout a range even when the image has high contrast.

Another object of the present invention is to achieve both wide dynamic range image capturing and color image capturing.

Specifically, the present invention provides A wide dynamic range image capturing apparatus comprising an image capturing device for capturing image data having an electric charge accumulation period varying every a frame, a preprocess block for performing DC adjustment, gain adjustment, and gamma characteristics adjustment with respect to the image data, a data storage memory for storing the image data, a memory control block for controlling a write or read operation of the image data with respect to the data storage memory, an image combining block for performing a combining operation process with respect to two frames of image data having the different electric charge accumulation periods to generate combined image data, and an image processing block for performing video signal processing with respect to the combined image data. The memory control block can perform in parallel a process of writing a current frame of image data captured by the image capturing device into the data storage memory, a process of reading a previous frame of image data stored in the data storage memory, and a process of writing the combined image data generated in the image combining block into the data storage memory.

As described above, according to the present invention, after the result of an operation of combining previous frame data and current frame data is output every a frame to optimize combined tone characteristics, luminance signal processing and color signal processing are performed. Therefore, there are less saturation and noise in an image in a range from a dark portion to a light portion, so that a moving image having a wide dynamic range can be captured without a sense of unnaturalness or awkwardness.

In addition, by automatically switching between normal image capturing and wide dynamic range image capturing based on the results of motion detection and highlight detection, wide dynamic range image capturing and normal capturing putting importance on the resolution of a moving image can be automatically switched, depending on a condition and a state of a subject.

BRIEF DESCRIPTION OF THE DRAWINGS

FIG. 3 is a diagram illustrating an enlarged output waveform of a dynamic range.

DETAILED DESCRIPTION OF THE PREFERRED EMBODIMENTS

Hereinafter, embodiments of the present invention will be described with reference to the accompanying drawings. The following description of the preferred embodiments is only for illustrative purposes, and is not intended to restrict the scope and use of the present invention.

Embodiment 1

Figure 1:
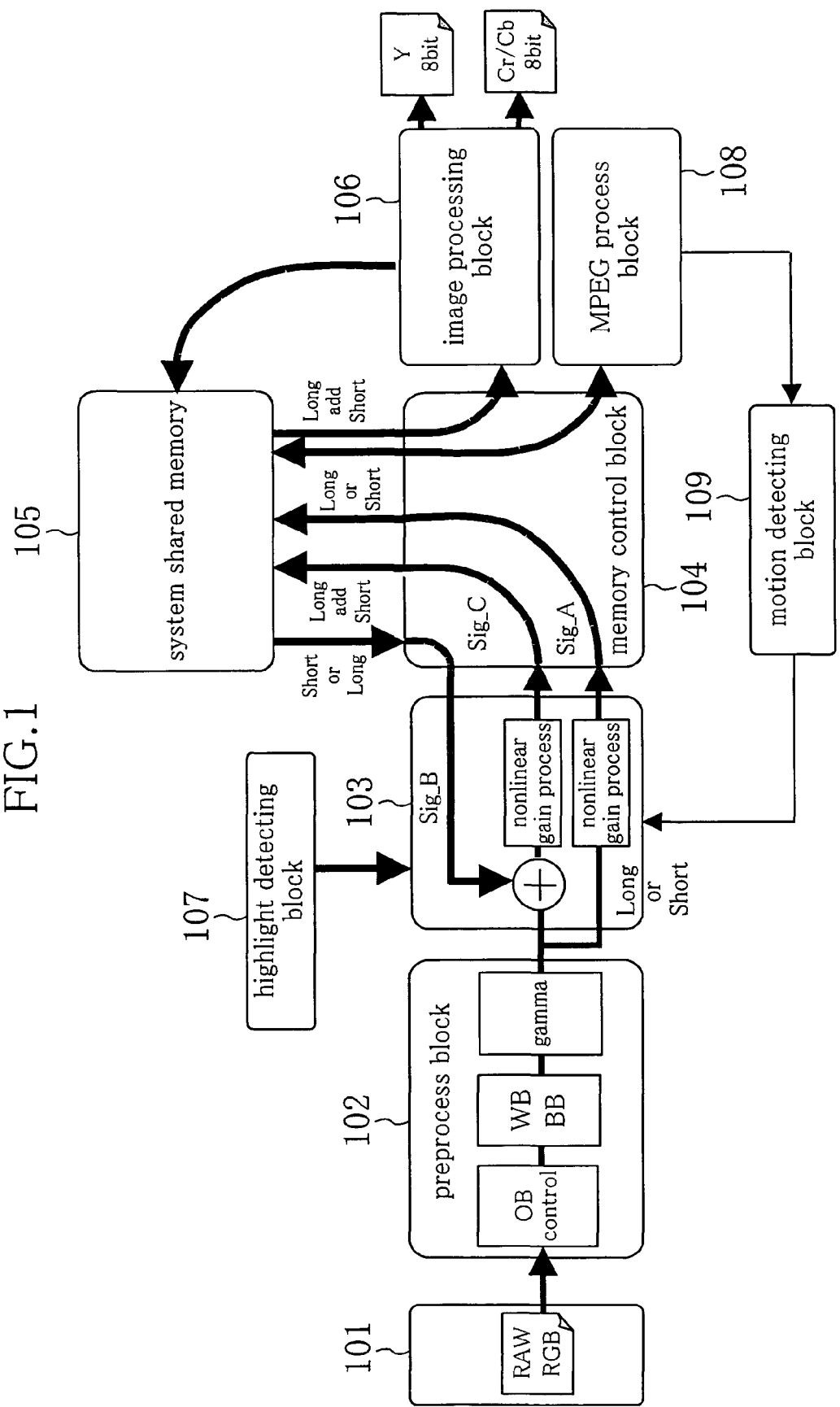
FIG. 1 is a block diagram illustrating a configuration of a wide dynamic range image capturing apparatus according to Embodiment 1 of the present invention.

FIG. 1 is a block diagram illustrating a configuration of a wide dynamic range image capturing apparatus according to Embodiment 1 of the present invention. In FIG. 1, 101 indicates an image capturing device for performing photoelectric conversion with respect to a subject. An image signal obtained by photoelectric conversion in the image capturing device 101 is output to a preprocess block 102.

The preprocess block 102 performs DC adjustment, gain adjustment, and gamma characteristics adjustment with respect to the input image signal. The resultant adjusted image signal is output to an image combining block 103.

The image combining block 103 has an interface for inputting and outputting write data and read data to and from a system shared memory 105, combines two pieces of frame data and performs nonlinear characteristics adjustment, and outputs a combined image data thus generated via a memory control block 104 to the system shared memory 105. A highlight detecting block 107 for detecting a highlight level of an image signal is connected to the image combining block 103.

The memory control block 104 performs read and write controls of image data with respect to the system shared memory 105 for storing image data.

Image data stored in the system shared memory 105 is read by an image processing block 106 and an MPEG processing block 108.

The image processing block 106 performs luminance signal processing and color signal processing with respect to a combined image signal, and feeds the process result back to the system shared memory 105.

The MPEG processing block 108 performs an MPEG process with respect to data obtained by image processing, and outputs motion vector data obtained by the MPEG process to a motion detecting block 109.

The motion detecting block 109 performs motion detection with respect to motion vector data obtained by the MPEG process, and based on the result of the detection, switches image capture modes.

Next, an operation of the wide dynamic range image capturing apparatus of Embodiment 1 will be described.

Initially, in an image capturing portion of the image capturing device 101, a subject composed of differences between light intensities is imaged, and is converted into an electrical signal (electric charges). Here, since a light intensity is proportional to an electric charge amount, electric charges obtained during a predetermined period of time (electric charge accumulation period) are converted into a voltage, which is in turn output as an electrical signal. Therefore, if the electric charge accumulation period is short, signal saturation does not occur even when the light intensity is high. On the other hand, if the electric charge accumulation period is long, a sufficiently large signal is obtained even when the light intensity is low.

Next, a frame output of the sensor by controlling the electric charge accumulation period (photoelectric conversion period) of the image capturing device 101 will be described.

Figure 2:
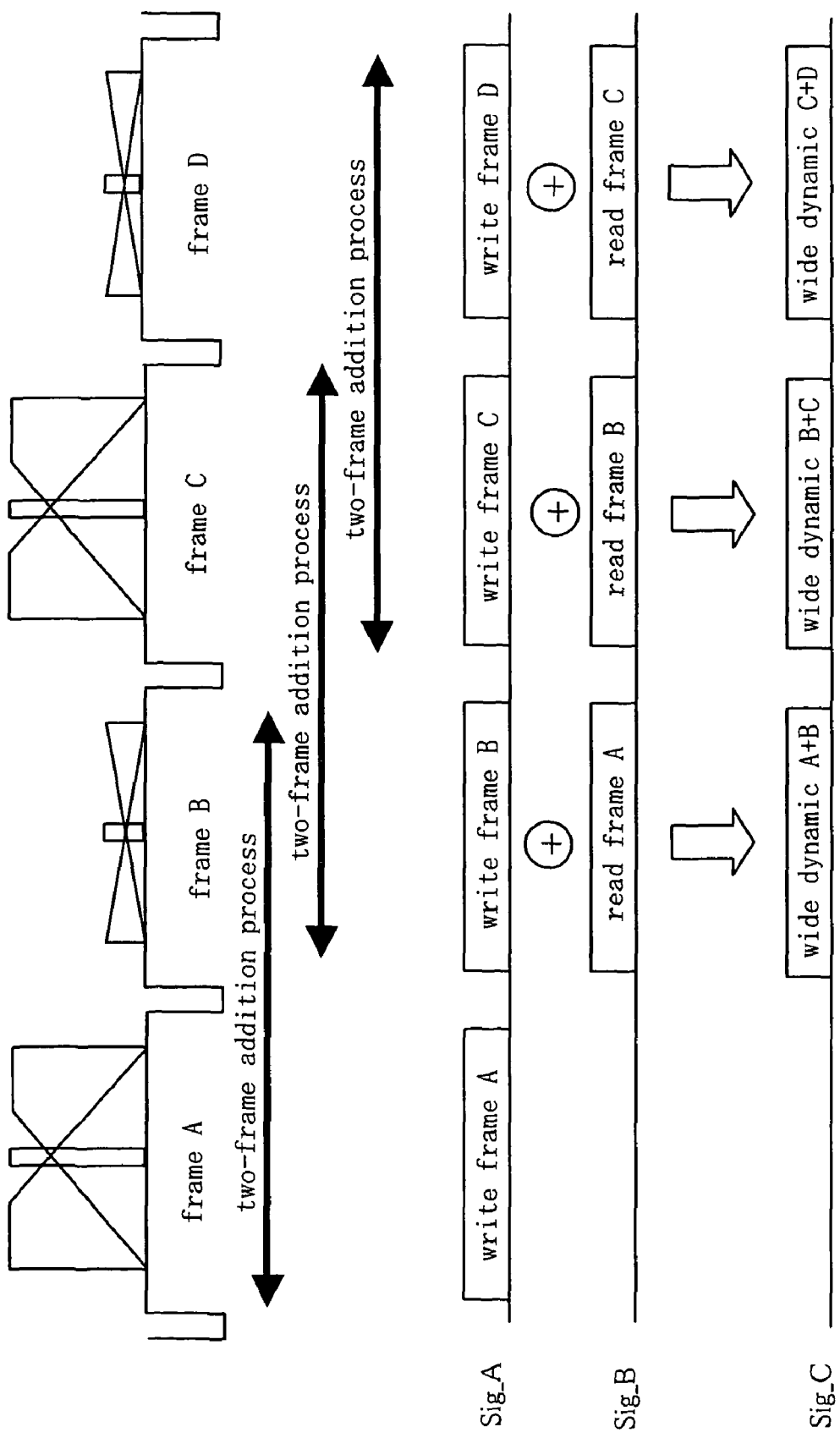
FIG. 2 is a diagram illustrating an output waveform when an electric charge accumulation period is controlled on a frame-by-frame basis.

FIG. 2 is a diagram illustrating an output waveform when the electric charge accumulation period is controlled on a frame-by-frame basis. In Embodiment 1, two frames constitute one cycle, and outputs having an exposure time varying every a frame are successively output. In the preprocess block 102, a DC level, a white balance, and a black balance are adjusted on a frame-by-frame basis before a gamma process is performed.

During a frame period, image data of a current frame is input to the system shared memory 105 while previous frame data is read from the system shared memory 105, and an output of operation of the previous frame data and the current frame data is stored into the system shared memory 105 every a frame.

Here, when the two types of image data are written into the system shared memory 105, the image combining block 103 can subject the current frame data to a nonlinear gain process to weight a frame signal.

Also, by subjecting the combined frame image data to a nonlinear gain process, signal characteristics when two different frame combined image signals have poor continuity can be improved.

Specifically, before the combined frame image data is output to the system shared memory 105, combined tone characteristics set by the preprocess block 102 are subjected to a nonlinear gain process so that change point characteristics due to data combination are changed to continuous characteristics.

FIG. 3 is a diagram illustrating an enlarged output waveform of a dynamic range. In Embodiment 1, output signals of the image capturing device 101 are combined, where two frames constitute one cycle.

As illustrated in FIG. 3, when the electric charge accumulation period is long, a high luminance subject portion of an output signal of the image capturing device 101 is saturated, so that a level of thereof is clipped. However, by combining the output signal with an output signal of the image capturing device 101 when the electric charge accumulation period is short, level combination can be performed without impairing a tone of a low illuminance portion.

Thus, two types of frame image signals having different dynamic ranges are weighted and added by the image combining block 103, thereby making it possible to obtain a single image having combined tones, i.e., an image having a wide dynamic range.

The combined image data thus obtained is stored into the system shared memory 105, and is read out by the memory control block 104 synchronously or asynchronously with the image inputting, and a luminance signal and a color signal are generated in the image processing block 106. In this case, the luminance signal and the color signal are written into the system shared memory 105 by the memory control block 104 with a simultaneous parallel operation.

Also, the luminance signal and the color signal stored by the simultaneous parallel operation can be read out, a motion vector signal generated during an MPEG process by the MPEG processing block 108 can be input to the motion detecting block 109 to detect a motion of an area of interest, and normal image capturing and wide dynamic range image capturing can be automatically switched.

For example, wide dynamic range image capturing is switched to normal image capturing during capturing of moving images as follows. Detection of a highlight portion is performed in a short-time exposure data image which is read out every other frame. When the sum of area data having a predetermined level or more becomes any set value or less, dynamic range image capturing can be switched to normal image capturing automatically or by a feedback setting process using a CPU.

Also, normal image capturing is switched to wide dynamic range image capturing during capturing of moving images as follows. Motion detection is performed based on a correlation between a plurality of images which are read out every a frame. When a motion detection level of a set area of interest becomes a predetermined level or less, normal image capturing can be switched to dynamic range image capturing automatically or by a feedback setting process using a CPU.

Further, by the highlight detecting block 107, it is possible to achieve a wide dynamic range image capturing apparatus in which normal image capturing and wide dynamic range image capturing can be automatically switched in association with a highlight detection output which is obtained every a frame.

For example, normal image capturing is switched to wide dynamic range image capturing during capturing of moving images as follows. Detection of a highlight portion is performed in an image which is read out every a frame. When the sum of counts of data having a predetermined threshold or more in an area becomes any set value or more, normal image capturing can be switched to dynamic range image capturing automatically or by a feedback setting process using a CPU.

Also, wide dynamic range image capturing is switched to normal image capturing during capturing of moving images as follows. Detection of a highlight portion is performed in a long-time exposure data image which is read out every other frame. When the sum of area data having a predetermined level or more becomes any set value or less, dynamic range image capturing can be switched to normal image capturing automatically or by a feedback setting process using a CPU.

Here, the signal level of the combined image becomes 200% at maximum when a nonlinear gain process is not performed. The signal level of the combined image may be compressed to 100% before the combined image is written into the system shared memory 105. Alternatively, in view of an improvement in S/N, the data range can be increased by 1 bit while keeping 200% before writing is performed, and in subsequent image processing, the range of input data can be increased by 1 bit before signal processing is performed.

As described above, according to the image capturing apparatus of Embodiment 1, after the result of an operation of combining previous frame data and current frame data is output every a frame to optimize combined tone characteristics, luminance signal processing and color signal processing are performed. Therefore, there are less saturation and noise in an image in a range from a dark portion to a light portion, so that a moving image having a wide dynamic range can be captured without a sense of unnaturalness or awkwardness.

Embodiment 2

Figure 4:
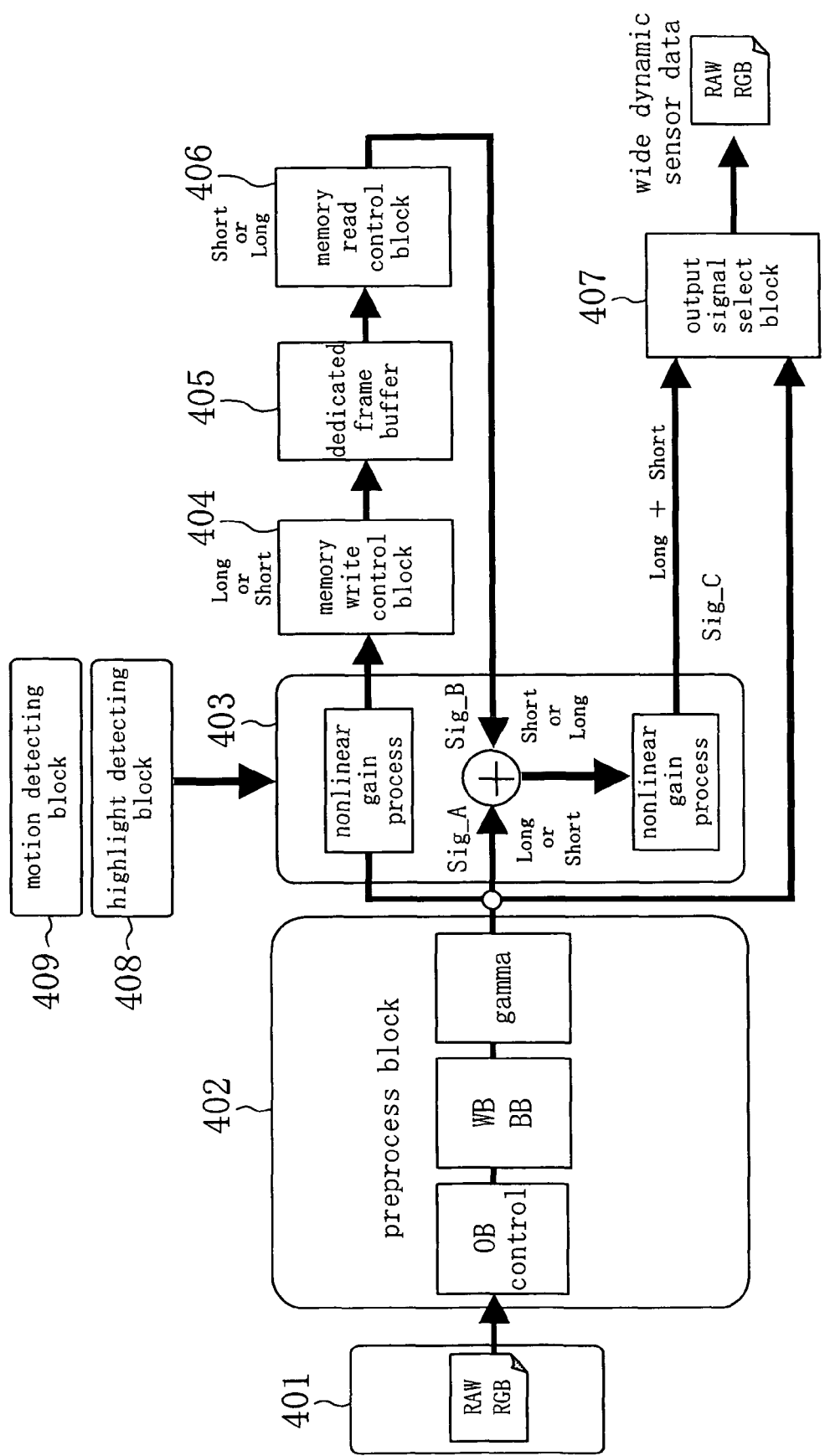
FIG. 4 is a block diagram illustrating a configuration of a wide dynamic range image capturing apparatus according to Embodiment 2 of the present invention.

FIG. 4 is a block diagram illustrating a configuration of a wide dynamic range image capturing apparatus according to Embodiment 2 of the present invention. Embodiment 2 is different from Embodiment 1 in that a system shared memory is not used to store image data, and a dedicated frame buffer is used to control writing and reading.

In FIG. 4, 401 indicates an image capturing device for performing photoelectric conversion with respect to a subject. An image signal obtained by photoelectric conversion in the image capturing device 401 is output to a preprocess block 402.

The preprocess block 402 performs DC adjustment, gain adjustment, and gamma characteristics adjustment with respect to the input image signal. The resultant adjusted image signal is output to an image combining block 403 and an output signal select block 407.

The image combining block 403 has an interface for inputting and outputting write data and read data to and from a dedicated frame buffer 405, combines two pieces of frame data and performs nonlinear characteristics adjustment, and outputs a combined image signal thus generated to a memory write control block 404.

A highlight detecting block 408 for detecting a highlight level of an image signal and a motion detecting block 409 for performing motion detection with respect to motion vector data obtained by an MPEG process, are connected to the image combining block 403.

The memory write control block 404 performs a write control of image data with respect to the dedicated frame buffer 405 for storing image data.

The image data stored in the dedicated frame buffer 405 is read by a control of a memory read control block 406 and is fed back to the image combining block 403. Thereafter, the image combining block 403 outputs a combined image signal to the output signal select block 407.

The output signal select block 407 selectively outputs an image signal output from the preprocess block 402 and a combined image signal output from the image combining block 403. The selected image signal is output as wide dynamic range sensor data.

Figure 5:
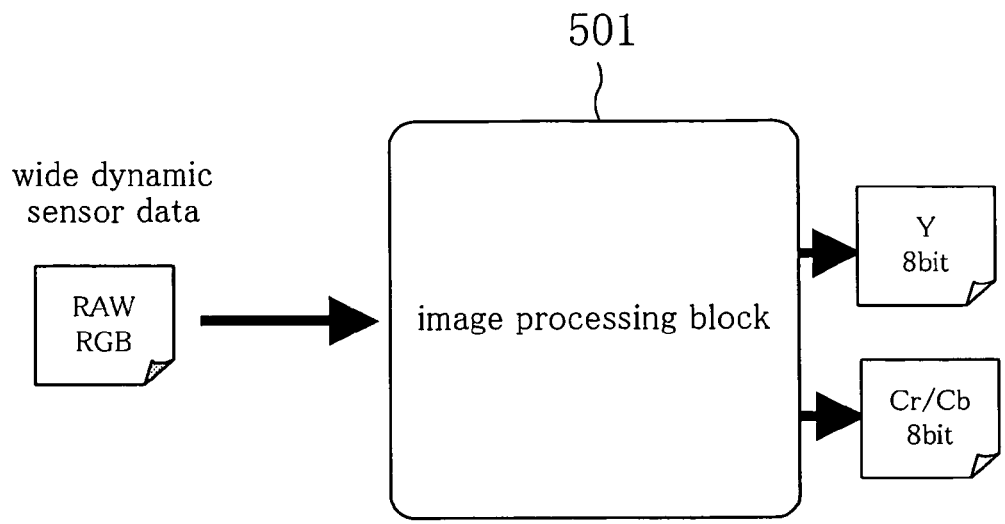
FIG. 5 is a block diagram illustrating a first form of image signal processing.

FIG. 5 is a block diagram illustrating a first form in which sensor data processed by wide dynamic range image capturing is input and subjected to image signal processing. As illustrated in FIG. 5, wide dynamic range sensor data is input to an image processing block 501, and luminance signal processing and color signal processing are performed in the image processing block 501.

Figure 6:
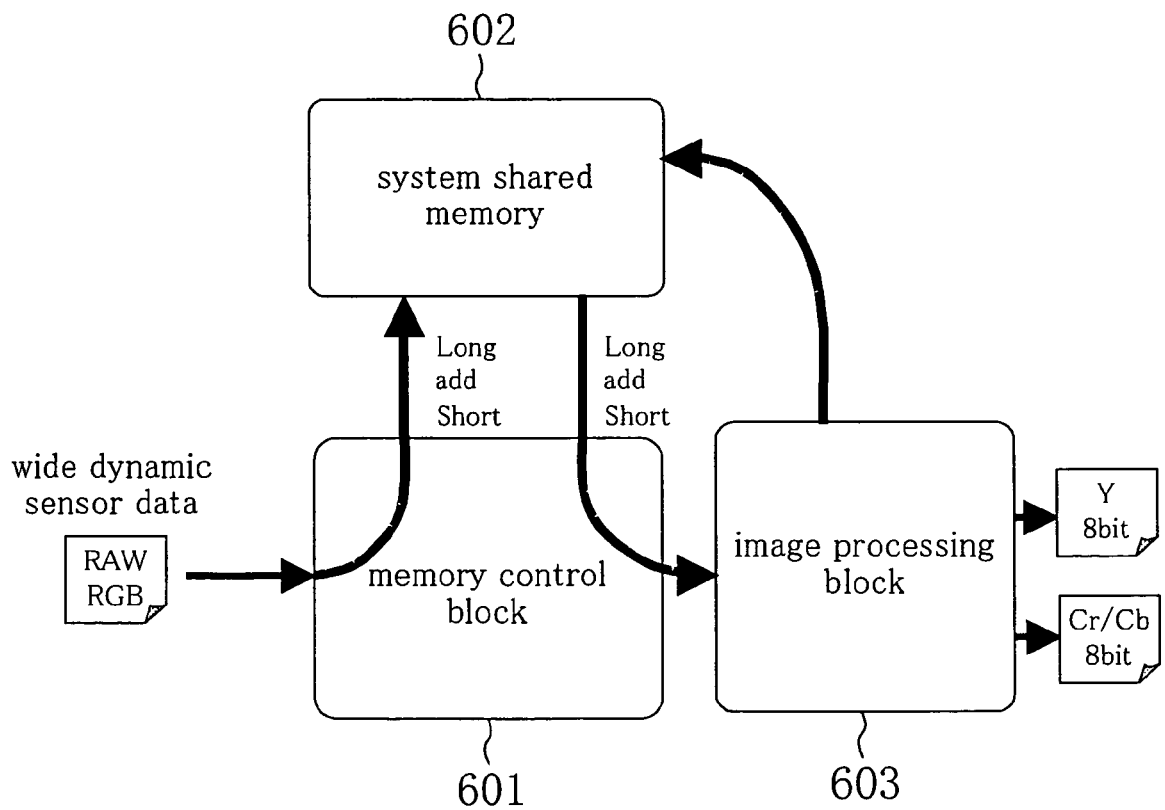
FIG. 6 is a block diagram illustrating a second form of image signal processing.
Figure 7:
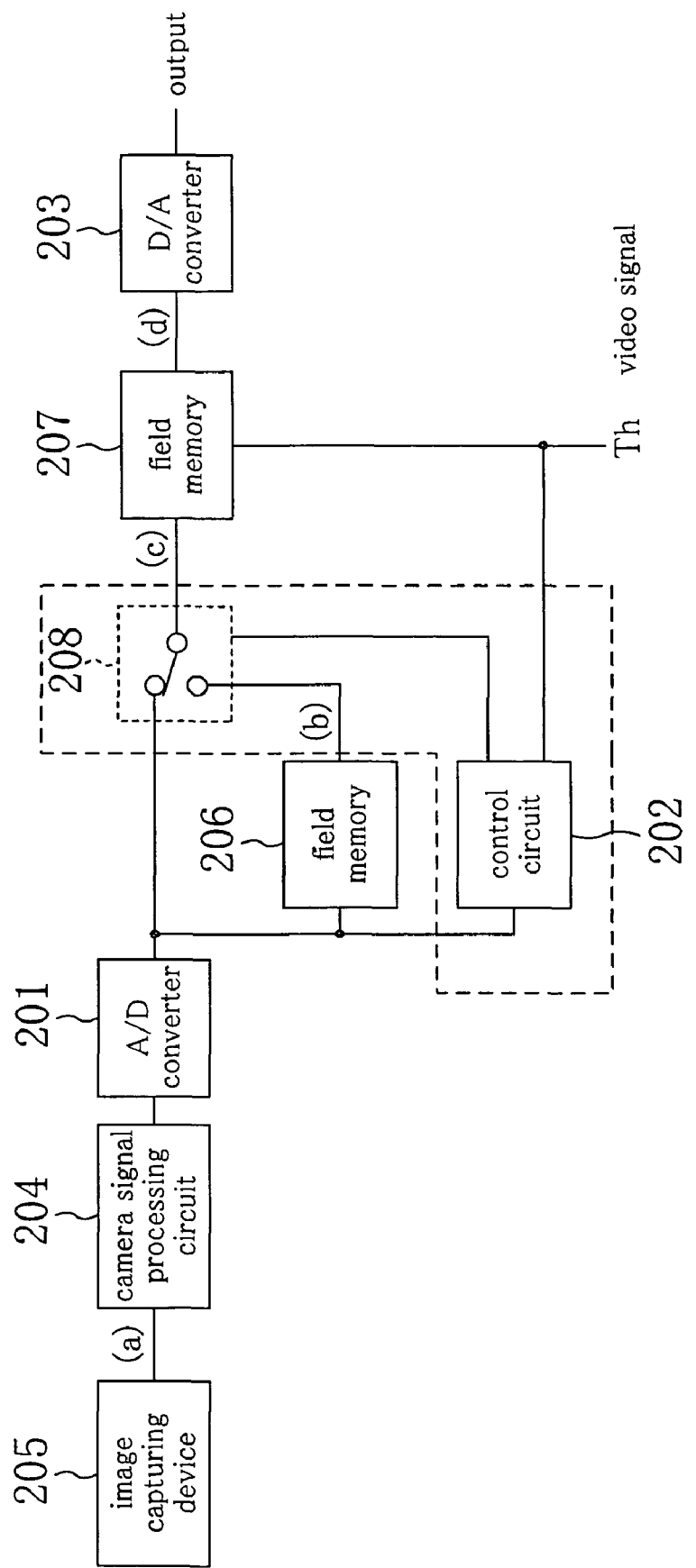
FIG. 7 is a block diagram illustrating a configuration of a conventional wide dynamic range image capturing apparatus.
Figure 8:
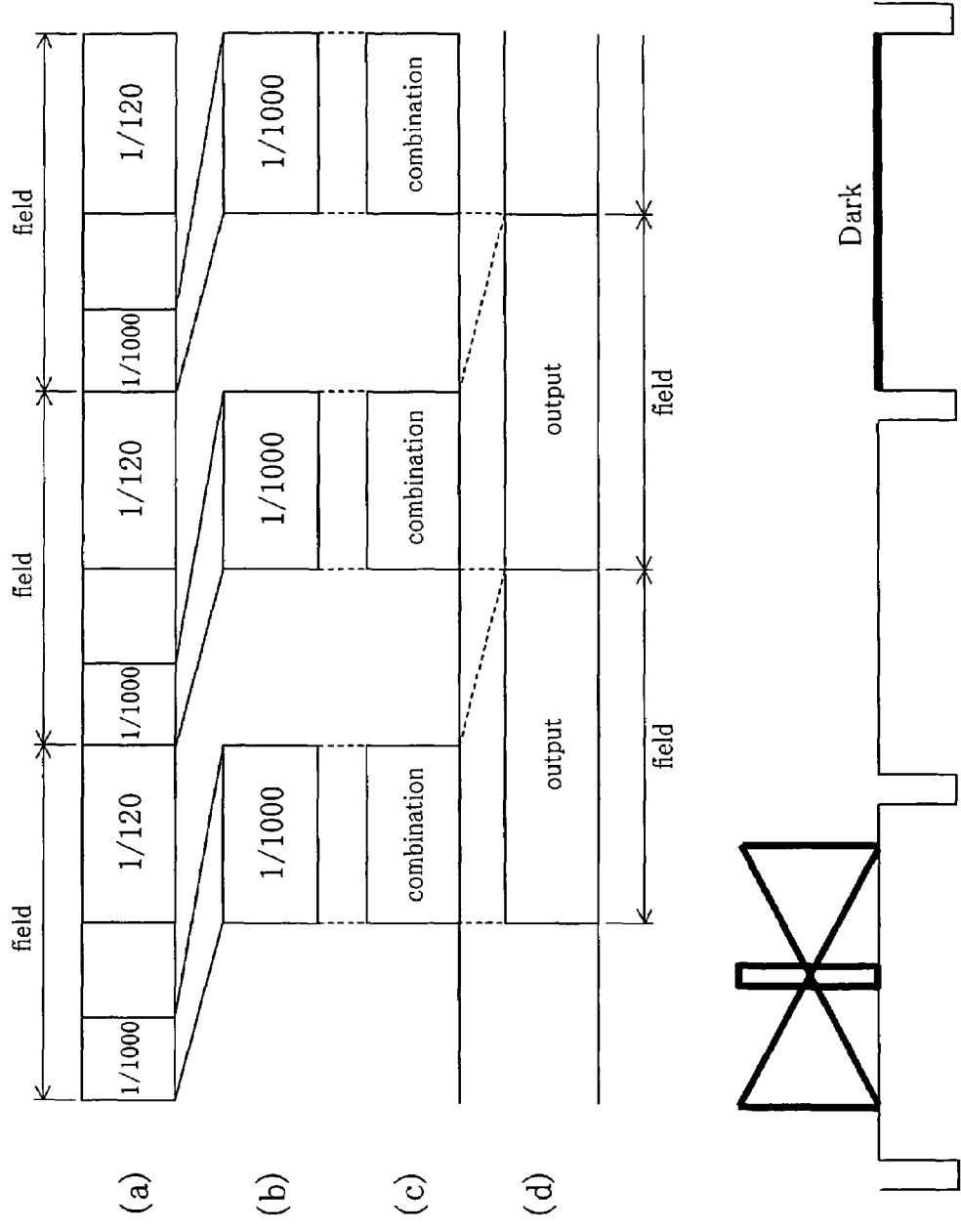
FIG. 8 is a diagram for describing an operation of the conventional image capturing apparatus of FIG. 7.

FIG. 6 is a second form in which sensor data processed by wide dynamic range image capturing is input and subjected to image signal processing. As illustrated in FIG. 6, wide dynamic range sensor data is input to a memory control block 601. The data is written into a system shared memory 602 by the memory control block 601. A read process is performed by a simultaneous parallel operation. A luminance signal and a color signal are generated in an image processing block 603, and are written back into the system shared memory 602.

Next, an operation of the wide dynamic range image capturing apparatus of Embodiment 2 thus configured will be described.

In Embodiment 2, a frame output of a sensor by controlling an electric charge accumulation period (photoelectric conversion period) of the image capturing device 401, will be described. Initially, outputs having an exposure time varying every a frame are successively output, where two frames constitute one cycle. In the preprocess block 402, a DC level, a white balance, and a black balance are adjusted on a frame-by-frame basis before a gamma process is performed.

During a frame period, image data of a current frame is input to the dedicated frame buffer 405 while previous frame data is read from the dedicated frame buffer 405, and an output of operation of the previous frame data and the current frame data is output to a succeeding processing portion every a frame.

Here, when the two types of image data are written into the dedicated frame buffer 405, the image combining block 403 can subject the current frame data to a nonlinear gain process to weight a frame signal.

Also, by subjecting the combined frame image data to a nonlinear gain process, signal characteristics when two different frame combined image signals have poor continuity can be improved.

Thus, by weighting two types of frame image signals having different dynamic ranges and thereafter adding the two signals in the image combining block 403, a single image having combined tone can be obtained. In other words, an image having a wide dynamic range can be obtained.

The combined image data thus obtained is stored into the dedicated frame buffer 405, and is read out by the memory write control block 404 and the memory read control block 406 synchronously or asynchronously with the image inputting. A combined signal or a through signal is selectively output by the output signal select block 407.

Here, when image processing is performed in the first form of FIG. 5, an output combined signal is input to the image processing block 501, and a luminance signal and a color signal are generated by a simultaneous process in the image processing block 501.

On the other hand, when image processing is performed in the second form of FIG. 6, an output combined signal is written into the system shared memory 602, a read process is performed with respect to the memory control block 601 by a parallel operation, and a luminance signal and a color signal are generated in the image processing block 603, as in Embodiment 1. Thereafter, by the memory control block 601, the luminance signal and the color signal are written back into the system shared memory 602.

Note that, as in Embodiment 1, a stored luminance signal and color signal can be read out by a simultaneous parallel operation, an MPEG process can be performed in the MPEG processing block, a motion of an area of interest can be detected from a motion vector signal, and normal image capturing and wide dynamic range image capturing can be automatically switched, depending on the output selection of the output signal select block 407.

Alternatively, the output selection of the output signal select block 407 may not be used. When signal data of the previous frame is stored into the dedicated frame buffer 405 by an addition circuit of the signal data image combining block 403, the gain of a combined sensor data signal can be adjusted by an nonlinear gain process, where a gain 0 is data 0, and the resultant signal is output as a through output.

Further, as in Embodiment 1, a wide dynamic range image capturing apparatus can be achieved in which normal image capturing and wide dynamic range image capturing can be automatically switched in association with a highlight detection output of the highlight detecting block 408 which is obtained every a frame.

Although the signal level of a combined image reaches 200% at maximum when a nonlinear gain process is not performed, the combined image may be compressed into 100% before being written into the system shared memory 602. Alternatively, in view of an improvement in S/N, the data range can be increased by 1 bit while keeping 200% before writing is performed, and in subsequent image processing, the range of input data can be increased by 1 bit before signal processing is performed.

As described above, according to the image capturing apparatus of Embodiment 2, after the result of an operation of combining previous frame data and current frame data is output every a frame to optimize combined tone characteristics, luminance signal processing and color signal processing are performed. Therefore, there are less saturation and noise in an image in a range from a dark portion to a light portion, so that a moving image having a wide dynamic range can be captured without a sense of unnaturalness or awkwardness.

Further, in single-plate image capturing apparatuses employing a single image capturing device which are most widespread as consumer products, a significant improvement in dynamic range, which is conventionally a most significant challenge, can be achieved. The present invention has a significant practical value.

Regarding a plurality of images having different electric charge accumulation periods, although two frames constitute one cycle in Embodiment 2, three or more frames may constitute one cycle. In this case, two or more previous frames may be read from a system shared memory or a plurality of dedicated frame buffers, and may be combined with current frame data.

If image data of a previous frame is read from a dedicated frame buffer while image data of a current frame captured by an image capturing device is written into the same address, image data can be read and written using a minimum buffer memory size.

The embodiments of the present invention are implemented in the form of an apparatus, or alternatively, in accordance with the configuration, may be implemented in the form of software, which is processed by a computer.

As described above, the present invention has a highly practical effect of providing a sufficient dynamic range to image capturing apparatuses, and therefore, is significantly useful and applicable.

What is claimed is:

1. A wide dynamic range image capturing apparatus comprising:
    an image capturing device for capturing image data having an electric charge accumulation period varying every frame;
    a preprocess block for performing DC adjustment, gain adjustment, and gamma characteristics adjustment with respect to the image data;
    a single shared data storage memory for storing the image data;
    a memory control block for controlling a write or read operation of the image data with respect to the single shared data storage memory;
    an image combining block for performing a combining operation process with respect to two frames of image data having the different electric charge accumulation periods to generate combined image data; and
    an image processing block for performing video signal processing with respect to the combined image data, wherein the memory control block performs in parallel a process of writing a current frame of image data captured by the image capturing device into the single shared data storage memory, a process of reading a previous frame of image data stored in the single shared data storage memory, and a process of writing the combined image data generated in the image combining block into the single shared data storage memory;

the image capturing device successively outputs image data having an electric charge accumulation period varying every frame, where two frames constitute one cycle, and the memory control block performs in parallel a process of writing the current frame of the image data captured by the image capturing device into the single shared data storage memory during a frame period, a process of reading the previous frame of the image data stored in the single shared data storage memory during the frame period, and a process of writing the combined image data generated in the image combining block into the single shared data storage memory every frame.

2. The wide dynamic range image capturing apparatus of claim 1, wherein the image combining block causes an operation bit width of luminance signal processing and color signal processing in the generated combined image data to be larger by 1 bit than a bit width of captured image signal data, and stores the combined image data into the data storage memory.

3. The wide dynamic range image capturing apparatus of claim 1, wherein the preprocess block performs different characteristics adjustments with respect to two frames of image data having the different electric charge accumulation periods, respectively.

4. The wide dynamic range image capturing apparatus of claim 1, wherein the image combining block performs a combining operation process with respect to two frames of image data having the different electric charge accumulation periods to generate combined image data before performing a nonlinear gain process with respect to the combined image data.

5. The wide dynamic range image capturing apparatus of claim 1, further comprising:

a highlight detecting block for detecting a highlight portion in an image read out every frame, wherein the image combining block, when the highlight detecting block detects that a sum obtained by counting data having a predetermined threshold or more in an area becomes any set value or more, switches normal image capturing to wide dynamic range image capturing automatically or by a feedback setting process using a CPU.

6. The wide dynamic range image capturing apparatus of claim 5, wherein the highlight detecting block detects a highlight portion in a long-time exposure data image read out every other frame, and the image combining block, when the highlight detecting block detects that a sum of area data having a predetermined level or more becomes any set value or less, switches wide dynamic range image capturing to normal image capturing automatically or by a feedback setting process using a CPU.

7. The wide dynamic range image capturing apparatus of claim 2, wherein the highlight detecting block detects a highlight portion in a short-time exposure data image read out every other frame, and the image combining block, when the highlight detecting block detects that a sum of area data having a predetermined level or more becomes any set value or less, switches wide dynamic range image capturing to normal image capturing automatically or by a feedback setting process using a CPU.

8. The wide dynamic range image capturing apparatus of claim 1, further comprising:

a motion detecting block for performing motion detection based on a correlation between a plurality of images read out every frame, wherein, when a motion detection level of a set area of interest in the image data becomes a predetermined level or less, normal image capturing is switched to wide dynamic range image capturing automatically or by a feedback setting process using a CPU.

9. The wide dynamic range image capturing apparatus of claim 8, wherein the image combining block, when the motion detection level of the set area of interest in the image data becomes the predetermined level or more, switches wide dynamic range image capturing to normal image capturing automatically or by a feedback setting process using a CPU.

10. The wide dynamic range image capturing apparatus of claim 9, wherein the motion detecting block generates a motion detection signal using a motion vector of an MPEG function as input information, and the image combining block switches between normal image capturing and wide dynamic range image capturing based on the motion detection signal.

11. The wide dynamic range image capturing apparatus of claim 1, wherein a preprocess of performing an image capturing operation in which a current frame of image data captured by the image capturing device and a previous frame of image data stored in the single shared data storage memory are subjected to a combining operation process in the image combining block and resultant data is stored into the single shared data storage memory, and a post-process of reading out and subjecting the combined image data generated in the image combining block to video signal processing, are performed in parallel by an asynchronous memory control operation.

* * * * *